United States Patent

Sato et al.

[11] Patent Number: 4,514,559
[45] Date of Patent: Apr. 30, 1985

[54] WATER SOLUBLE DISAZO COMPOUND, COPPER SALT THEREOF, AND SHEET OR FILM COLORED THEREWITH

[75] Inventors: Giichi Sato, Tokyo; Tadashi Matuo, Koonosu; Tooru Tabei, Kitamoto, all of Japan

[73] Assignee: Nippon Kayaku Kabushiki Kaisha, Tokyo, Japan

[21] Appl. No.: 604,475

[22] Filed: Apr. 27, 1984

[51] Int. Cl.³ .............................................. C09B 45/24
[52] U.S. Cl. ..................................... 534/690; 534/689; 252/585
[58] Field of Search .................. 252/585; 260/186, 187, 260/191, 184, 148, 174; 524/159; 106/193 D, 193 R

[56] References Cited

U.S. PATENT DOCUMENTS

| | | | |
|---|---|---|---|
| 1,936,277 | 11/1933 | Straub et al. | 260/12 |
| 2,173,304 | 9/1939 | Land et al. | 252/585 X |
| 2,175,815 | 10/1939 | Schindhelm | 260/148 |
| 2,636,030 | 4/1953 | Keller | 260/187 |
| 3,259,618 | 7/1966 | Andrew | 260/187 |
| 4,008,213 | 2/1977 | Brouard et al. | 260/152 X |
| 4,118,182 | 10/1978 | Smith | 260/187 X |
| 4,169,832 | 10/1979 | Wicki et al. | 260/187 X |
| 4,297,278 | 10/1981 | Nickel | 260/191 X |
| 4,331,596 | 5/1982 | Beffa et al. | 260/191 X |

FOREIGN PATENT DOCUMENTS

| | | | |
|---|---|---|---|
| 51-54447 | 5/1976 | Japan | 252/585 |
| 57-36693 | 2/1982 | Japan | 252/585 |

*Primary Examiner*—Teddy S. Gron
*Assistant Examiner*—Catherine S. Kilby
*Attorney, Agent, or Firm*—Banner, Birch, McKie & Beckett

[57] ABSTRACT

A water soluble disazo compound represented by the general formula:

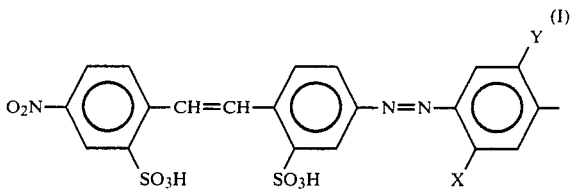

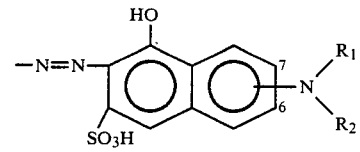

wherein X represents a hydrogen atom or a methyl, methoxy or ethoxy group, Y represents a methoxy or ethoxy group, $R_1$ represents a hydrogen atom or a methyl group, $R_2$ represents a hydrogen atom or a methyl, $-C_2H_4OH$,

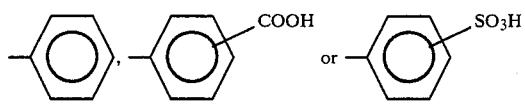

group, and the

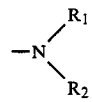

group is bonded at the 6- or 7-position, a copper complex salt thereof, and a sheet or film colored therewith.

11 Claims, No Drawings

WATER SOLUBLE DISAZO COMPOUND, COPPER SALT THEREOF, AND SHEET OR FILM COLORED THEREWITH

This invention relates to a water soluble disazo compound represented, in the free acid form, by the formula:

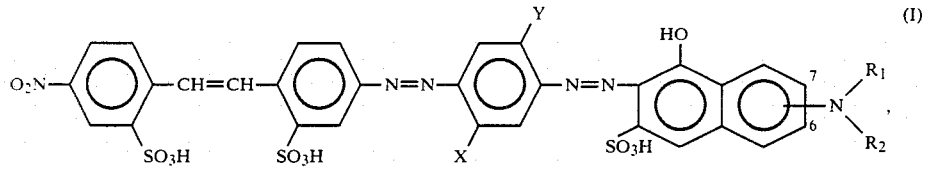

wherein X represents a hydrogen atom or a methyl, methoxy or ethoxy group; Y represents a methoxy or ethoxy group; $R_1$ represents a hydrogen atom or a methyl group; $R_2$ represents a hydrogen atom or a methyl,

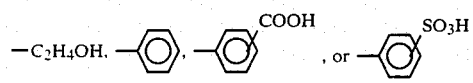

group, and the

group is bonded at the 6- or 7-position, a copper complex salt thereof, and a sheet or film colored therewith.

Though the compounds of the formula (I) or the copper complex salts thereof according to this invention may also be used for dyeing cellulose fibers, their principal uses are for preparation of colored sheets or films, particularly a polarizing sheet or film.

A polarizing sheet or film is a functional material which, although it has long since been used in such optical devices as sunglasses and goggles, has newly acquired importance since it came to be used in liquid crystal display devices of electronic calculators, wristwatches, etc. As a polarizing sheet or film for liquid crystal display devices, there has been solely used polyvinyl alcohol (hereinafter referred to as PVA) colored with iodine because of its excellent polarizability or contrast effect. But, although the use of liquid crystal display devices started with such small size articles as electronic calculators and wristwatches, its application to larger size articles has been aimed at with the progress of electronic technology. As a result, its application field is extending to such high-performance, large-size articles as automobile instrumental panels, liquid-crystal televisions, measuring instruments, and display devices of microcomputers or word processors. Accordingly, the durability of liquid crystal display devices, particularly the durability of the polarizing sheet or film which constitutes a part of the devices, has come to be required more strongly.

The defect of the polarizing sheet or film composed of PVA colored with iodine mentioned above lies in its insufficient durability. In the present state, in fact, its poor durability, particularly its poor resistance to humidity/heat (high humidity at a high temperature) and to heat imposes restrictions on its use in display devices for high-performance articles. Moreover, although it is becoming increasingly necessary to integrally combine a polarizing sheet or film with a transparent electrode in a body, with increasing demand for the design of a thinner liquid-crystal display device, the PVA colored with iodine is difficulty combined into a thin article since its heat resistance in processing is insufficient on such combining process.

On the other hand, some polarizing sheets or films for a colour display using a dye as a polarizing film element which has an excellent durability are well known. But, since the sheets or films have a low polarizability and hence exhibit a low contrast effect on letters, etc., they have not come to be used widely.

Under these circumstances, the present inventors have found, after extensive studies, that PVA-type sheets or films dyed with a water soluble azo compound represented, in the free acid form, by the formula (I) or a copper complex salt thereof, particularly those which are obtained by uniaxially stretching the sheet or film before, after or during the dyeing, can be used as a polarizing film with a high polarizability and excellent contrast effect.

Also in other application fields where polariztging function is not required, for example in color filters for a liquid-crystal television and for a video camera, the demand for a color optical filter having an excellent durability, particularly resistance to light and heat, has become increasingly large. The PVA-type sheet or film dyed with a compound of the formula (I) or a copper complex salt thereof can be utilized also in such application fields. When the sheet or film is used as an optical filter, the stretching is unnecessary. For improving its strength and durability, however, the sheet or film may be stretched biaxially in equal ratio or biaxially in different ratio either before, after or during the dyeing.

An object of this invention is to provide a novel water soluble disazo compound of the formula (I) and a copper complex salt thereof.

Another object of this invention is to provide a sheet or film colored with the compounds or the copper complex salts mentioned above.

Other objects and advantages of this invention will become apparent from the descriptions that follow.

The water soluble disazo compounds and the copper complex salts thereof according to this invention can be prepared in the following way.

Thus, a compound represented by the formula:

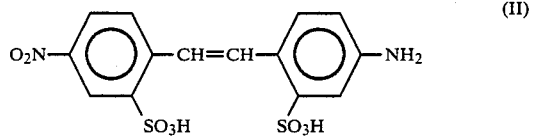

is diazotized in a conventional manner, and then coupled with a compound represented by the formula:

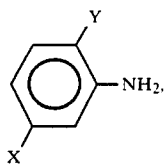

(III)

wherein X and Y represent each the same meanings as mentioned above, to give a monoazo compound represented by the formula:

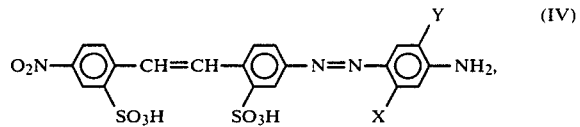

(IV)

wherein X and Y represent each the same meanings as mentioned above; the monoazo compound is further diazotized, and coupled in a conventional manner with a compound represented by the formula:

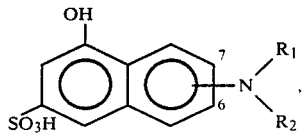

(V)

wherein $R_1$ and $R_2$ represent each the same meanings as mentioned above, and the group

is bonded at 6- or 7-position, to yield a water soluble disazo compound of the formula (I). A further treatment of the compound thus obtained with a copper compound such as copper sulfate, copper acetate and copper chloride in a conventional manner gives a copper complex salt of the compound represented by the formula (I).

Although the compounds of the formula (I) are prepared usually as its sodium salt, they can also be prepared in the form of three acid or other salts including salts of potassium, lithium, ammonium, alkylammonium and ethanolammoniums.

Examples of the compounds corresponding to the formula (III) include

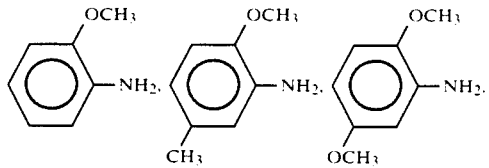

-continued

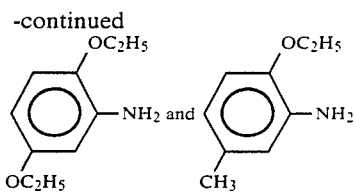

Examples of the compounds represented by the formula (V) include 3-sulfo-6-amino-1-naphthol (hereinafter referred to as J acid), N-methyl-J acid, N-(2-hydroxyethyl)-J acid, N-phenyl-J acid, N-methyl-N-phenyl-J acid, N-(3- or 4-carboxy phenyl)-J acid, N-methyl-N-(3- or 4-carboxy phenyl)-J acid, N-(3- or 4-sulfo phenyl)-J acid, N-methyl-N-(3- or 4-sulfo phenyl)-J acid, 3-sulfo-7-amino-1-naphthol (hereinafter referred to as γ acid), N-methyl-γ acid, N-(2-hydroxyethyl)-γ acid, N-phenyl-γ acid, N-methyl-N-phenyl-γ acid, N-(3- or 4-carboxy phenyl)-γ acid, N-methyl-N-(3- or 4-carboxy phenyl)-γ acid, N-(3- or 4-sulfo phenyl)-γ acid and N-methyl-N-(3- or 4-sulfo phenyl)-γ acid.

One preferred class of the water soluble azo compounds and the copper complex salt of this invention comprises a compound of formula (I) wherein X represents a methyl, methoxy or ethoxy group, Y represents a methoxy or ethoxy group, $R_1$ represents a hydrogen atom and $R_2$ represents a hydrogen atom, a methyl, β-hydroxyethyl, phenyl or carboxyphenyl group, and a copper complex salt thereof.

As materials of sheets or films of this invention, there may be mentioned PVA-type resin including PVA, polyvinyl acetal such as polyvinyl formal, polyvinyl acetoacetal and polyvinyl butyral and polyvinyl acetate; saponification products of ethylene-vinyl acetate copolymer such as a saponification product and a partial saponification product of ethylene-vinyl acetate copolymer containing 15 to 55% by mole of ethylene and regenerated cellulose such as cellophan.

As methods for preparing the coloured PVA-type sheet or film, there may be mentioned one wherein a formed PVA-type sheet of film is dyed as it is and one wherein a solution of PVA-type resin is mixed with a dye and the mixed solution or dope is formed into a sheet or film. First, general methods of dyeing and stretching of PVA-type sheet or film will be described below.

PVA-type sheet or film is dipped and dyed at 0° to 70° C., preferably at 30° to 45° C. in a dye bath containing an azo compound of the formula (I) or its copper complex salt and, as required, dyeing auxiliary such as inorganic salts and surface active agents, treated afterwards with an aqueous boric acid solution if necessary, and then dried. When polarizing function is to be given to the film, the sheet or film is stretched uniaxially at least 2-fold, preferably 2.5- to 4-fold before, after, or during the dyeing. When the sheet or film is stretched either before or after the dyeing, the stretching may be effected, besides under wet conditions (usually 0° to 70° C., preferably 30° to 45° C.) and also under dry conditions (usually in a temperature range of from room temperature to 180° C.). When the stretching is to be effected during the dyeing, the film is stretched in the dye bath at 0° to 70° C., preferably at 30° to 45° C.

In the method wherein a mixed dope or solution is formed into a sheet or film, the PVA-type material (resin) is first dissolved in such a solvent as water, an organic solvent or a solvent mixture of water and alcohol, and then mixed with a dye to give a dyed solution. The dyed solution or dope is then formed into a dyed film by casting, solution coating or extrusion. When it is intended to give a polarizing function to the dyed film thus obtained, the coloured sheet or film is uniaxially stretched under similar wet or dry conditions to those described above.

The term "uniaxial stretching" means herein not only to stretch a sheet or film in completely uniaxial direction (free width uniaxial stretching) but to stretch a sheet or film with some stretching also in the direction lateral to principal stretching in order to avoid lateral shrinkage (constant width uniaxial stretching).

The dyeing of sheets or films is effected in general by the above-mentioned method of dip dyeing or dope dyeing. But it is also possible to use a method wherein printing paste is prepared and printed on the sheet or film, and the sheet or film is then heated to effect dyeing by the diffusion of the dye into the interior of the sheet or film.

The azo compounds represented by the formula (I) or their copper complex salts may be used alone, but they may also be used in combination with other dyes to prepare a PVA-type sheet or film dyed in a variety of shades. Especially when the azo compounds of the formula (I) or their copper complex salts are used as a compounding ingredient for obtaining gray or black color most widely used, a dyed sheet or film which exhibits an excellent polarizability or absorption characteristic can be obtained.

The colored sheet or film thus prepared can be used as it is, but, in application fields where good durability is required, it is used after laminating the sheet or film to a supporting sheet or film such as those of polyester, polyvinyl chloride, cellulose triacetate or polyacrylic resin or after coating the coloured PVA-type sheet or film with a special polyacrylin resin, as an absorption filter or polarizing film.

As described above, the coloured PVA-type sheet or film of this invention is used not only as a usual optical filter, but also when given a polarizing function by uniaxial stretching, or a color polarizing sheet or film having an excellent polarization characteristic and durability, which is a great utility value.

In addition to the PVA-type coloured sheets or films as mentioned above, there can also be produced sheets or films such as excellent polarizing sheets or films or other optical filters in the same manner as above by using sheets or films of saponification products of ethylene-vinylacetate copolymer or regenerated cellulose.

This invention will be further illustrated in detail below with reference to Examples, but it is not limited thereto.

In the following examples, the "percent transmission" of a film refers to the visual percent transmission as determined in the wavelength range of from 380 to 740 nm, $Y_\perp$ indicates the percent transmission of a single polarizing film, $Y_\parallel$ indicates that of two polarizing films so arranged that their optical axes are parallel with each other, and $Y_{195}$ indicates that of two polarizing films so arranged that their optical axes are perpendicular with each other. The average percent polarization shown in the following equation was used as a measure for polarization characteristics.

$$\text{Average percent polarization } \rho = \sqrt{\frac{Y_\parallel - Y_\perp}{Y_\parallel + Y_\perp}} \times 100(\%)$$

In the following Examples, sulfonic acid and carboxylic acid groups in azo compounds are represented in the free acid forms.

EXAMPLE 1

In a conventional manner, 57.7 parts of sodium 4-nitro-4'-aminostilbene-2,2'-disulfonate was diazotized. By using sodium acetate as a neutralizing agent, the diazotized product was coupled with 18.7 parts of 2-methoxy-5-methylaniline which had been dissolved in an aqueous hydrochloric acid solution. After completion of the reaction, the product was precipitated by the addition of hydrochloric acid, filtered, and dried to yield 67.9 parts of the monoazo compound of the following formula:

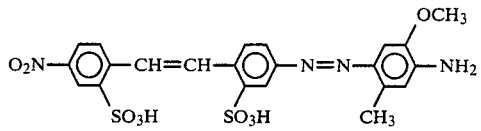

Into 1700 parts of water, was dissolved 67.9 parts of the monoazo compound together with 11.7 parts of sodium hydroxide, and 10.3 parts of sodium nitrite was dissolved further into the solution. Separately, an aqueous hydrochloric acid solution was prepared from 160 parts of water and 73 parts of 35% hydrochloric acid, and the above-mentioned mixed solution of the monoazo compound, sodium hydroxide and sodium nitrite was added dropwise thereto to effect diazotization at 5° to 10° C. After completion of the diazotization, sulfamic acid was added to the reaction mixture to remove nitrite ions. The diazonium salt thus obtained is added to a solution of 40.3 parts of N-phenyl-J acid in 1000 parts of 10% aqueous soda ash solution to effect coupling at 5° to 10° C. After stirring overnight, the resulting precipitate was filtered and dried to yield 75.3 parts of the water soluble disazo compound of the following formula. A solution of the diazo compound in a buffer of pH 9.5 showed $\lambda_{max}$ of 553 nm.

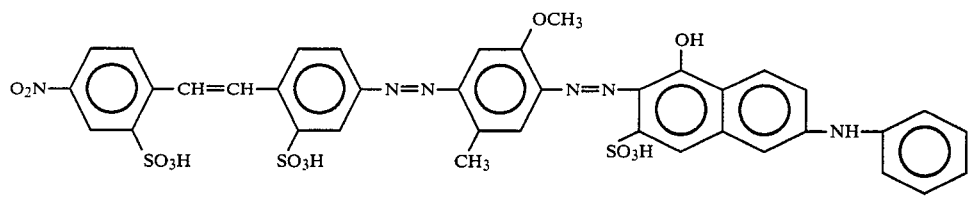

EXAMPLE 2

In the same manner as in Example 1 except that 30.5 parts of γ acid was used in place of 40.3 parts of N-phenyl-J acid, 69.2 parts of the water soluble disazo compound of the following formula was obtained.

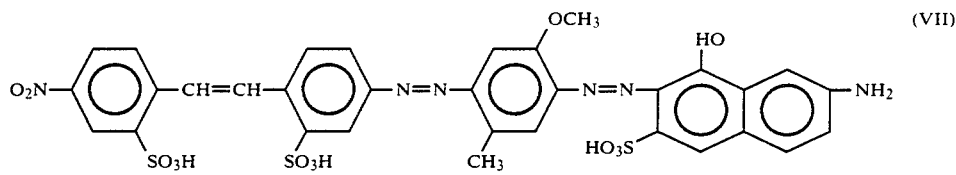

A solution of this compound in a buffer of pH 9.5 showed $\lambda_{max}$ of 562 nm.

EXAMPLE 3

Into a solution of 75.3 parts of the diazo compound prepared in Example 1 in 1200 parts of water, were added 110 parts of 20% aqueous solution of $CuSO_4 \cdot 5H_2O$, 60 parts of N,N-diethanolamine and 15 parts of 25% aqueous ammonia solution, and the mixture was heated for 8 hours at 95° C. A small amount of hydrochloric acid was added to the reaction mixture to give a pH of 9.0, then mixed with 12% of sodium chloride based on the volume of the reaction mixture, and the resulting precipitate was filtered and dried to give powder of the copper complex salt represented by the following formula. A solution of the dye in a buffer of pH 9.5 showed $\lambda_{max}$ of 598 nm.

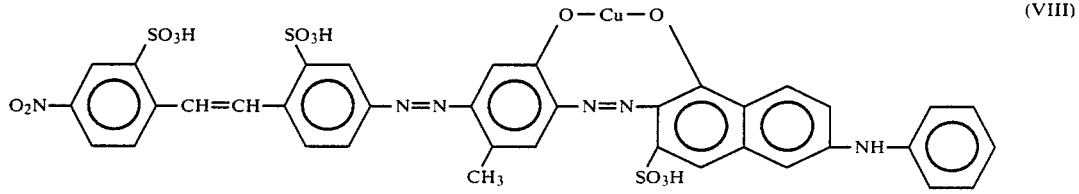

EXAMPLE 4

One part of the disazo compound represented by the above formula (VI) and 2.5 parts of Glauber's salt were dissolved in 1000 parts of water to form a dye bath to be used at 40° C.±1° C. A 4-fold stretched PVA film (30 mm wide and 50 mm long) whose one side has ben bonded onto a supporting film of cellulose triacetate was dipped and dyed in the dye bath for 5 minutes, rinsed with water, and then dried in a hot air dryer at 60° C. to give a PVA film colored blue. On a Hitachi 307-type color analyzer, in which the colored film was placed on the sample side and a colorless uniaxially stretched PVA film (laminated to a supporting film of cellulose triacetete) was placed on the compensation side, the percent transmission was measured for single film, two films in the parallel position, and two films in the crossed position. The $\lambda_{max}$ (maximum absorption wavelength) of the colored film was 588 nm. The visual percent transmission was 49.13% for single film ($Y_1$), 35.63% for two films in the parallel position ($Y_{||}$), and 10.75% for two films in the crossed position ($Y_\perp$). The average percent polarization ($\rho$) then was calculated as 73.23% from the equation mentioned above, thus exhibiting an excellent polarization characteristic of the film.

EXAMPLE 5

A PVA film (75 μm thick) was cut to a size of 30 mm wide and 70 mm long, stretched about 3.5-fold in a warm water of 40° C. and, while being maintained in the stretched state, dipped and dyed in 800 parts of a dye bath containing 0.8 part of the disazo compound represented by the formula (VII), rinsed with water, treated with an aqueous boric acid solution, and rinsed with water. After removing the water droplets on the film surface thoroughly with filter paper, the film was dried in a hot air dryer at 60° C. to obtain a violet dyed film.

The $\lambda_{max}$ of the film was 595 nm; the visual percent transmission was 36.02% for $Y_1$, 24.29% for $Y$ and 1.31% for $Y_\perp$; the average percent polarization $\rho$ was 94.74%.

EXAMPLE 6

A solution of 0.4 part of the disazo compound represented by the formula (VIII) in 400 parts of water was mixed with 1.0 part of Glauber's salt to form a dye bath. The dye bath was maintained at a temperature of 40° C., a PVA film (75 μm thick, 40 mm long and 30 mm wide) was dipped therein, and the film was dyed for about 2 minutes with stirring. The dyed film was rinsed with water, and uniaxially stretched about 3.5-fold in 5% aqueous boric acid solution at 40° C., and then rinsed with water while being maintained in the stretched state. After thoroughly removing the water on the film surface with filter paper, the film was dried for 3 minutes in a hot air dryer at 60° C., cut to an appropriate size, and examined for its percent transmission.

The film was deep blue in color; $\lambda_{max}$ was 633 nm; the visual percent transmission was 45.48% for $Y$, 32.54% for $Y_{||}$ and 9.64% for $Y_\perp$; the average percent polarization $\rho$ was 73.68%.

EXAMPLES 7 TO 16

A series of the disazo compounds and copper-complex salts thereof was prepared in the same manner as in Examples 1 to 3 by using, as the compounds of formulas (III) and (V), the compounds listed in Table 1 below. The $\lambda_{max}$ of solutions of these compounds in a buffer of pH 9.5 and the $\rho$ values of polarizing films prepared in the same manner as in Example 4 by using said compounds were shown in Table 1.

TABLE 1

| Example | Compound of formula (III) | Compound of formula (V) | Copper-complex formation | $\lambda_{max}$ (nm) | $Y_|$ (%) | $Y_{||}$ (%) | $Y_\perp$ (%) | $p$ (%) |
|---|---|---|---|---|---|---|---|---|
| 7 | 2-Methoxy-5-methylaniline | J acid | No | 543 | 42.95 | 30.54 | 6.51 | 80.55 |
| 8 | 2-Methoxy-5-methylaniline | J acid | Yes | 592 | 39.38 | 27.28 | 6.10 | 79.65 |
| 9 | 2-Methoxy-5-methylaniline | N—(4-Carboxyphenyl)-γ acid | No | 494 | 39.79 | 26.12 | 5.14 | 81.92 |
| 10 | 2,5-Dimethoxyaniline | N—Phenyl-J acid | No | 572 | 43.80 | 32.41 | 6.90 | 80.57 |
| 11 | 2-Methoxy-5-methylaniline | N—2-hydroxyethyl-γ acid | No | *482, 577 | 39.85 | 27.60 | 3.30 | 88.67 |
| 12 | 2-Methoxy-5-methylaniline | N—(4-Carboxyphenyl)-J acid | No | 559 | 37.88 | 25.38 | 3.92 | 85.59 |
| 13 | 2,5-Dimethoxyaniline | γ Acid | No | 575 | 44.93 | 32.43 | 8.09 | 77.51 |
| 14 | 2,5-Dimethoxyaniline | N—(4-Carboxyphenyl)-J acid | No | 573 | 37.55 | 24.76 | 4.48 | 83.27 |
| 15 | 2,5-Dimethoxyaniline | N—Methyl-γ acid | No | 610 | 34.97 | 21.49 | 2.18 | 90.32 |
| 16 | 2,5-Dimethoxyaniline | N—Phenyl-J acid | No | 648 | 35.30 | 22.33 | 3.70 | 84.61 |

Note:
*These two $\lambda_{max}$ have a nearly equal absorbance.

EXAMPLES 17 TO 28

In the same manner as in Examples 1 to 3 but by using the compounds of the formulas (III) and (V) listed in Table 2 below, a series of the disazo compounds was prepared. The compounds were dissolved in a buffer of pH 9.5 to determine its $\lambda_{max}$. The results were as shown in Table 2.

TABLE 2

| Example | Compound of formula (III) | Compound of formula (V) | Copper-complex formation | $\lambda_{max}$ (nm) |
|---|---|---|---|---|
| 17 | 2-Methoxy-5-methylaniline | N—(4-Sulfophenyl)-γ acid | No | 571 |
| 18 | 2,5-Dimethoxyaniline | N—(3-Sulfophenyl)-γ acid | No | 580 |
| 19 | 2-Methoxy-5-methylaniline | N—methyl-γ acid | No | 568 |
| 20 | 2,5-Dimethoxyaniline | N—(4-Carboxyphenyl)-γ acid | No | 582 |
| 21 | 2,5-Dimethoxyaniline | N—(4-Sulfophenyl)-J acid | Yes | 608 |
| 22 | 2-Methoxy-5-methylaniline | N,N—Dimethyl-J acid | Yes | 603 |
| 23 | 2,5-Diethoxyaniline | N—Phenyl-J acid | No | 575 |
| 24 | 2,5-Dimethoxyaniline | γ acid | Yes | 669 |
| 25 | 2,5-Dimethoxy-5-methyl-aniline | γ acid | Yes | 638 |
| 26 | 2,5-Dimethoxyaniline | N—(4-Carboxyphenyl)-J acid | Yes | 624 |
| 27 | 2-Methyl-5-methoxyaniline | N—(4-Carboxyphenyl)-J acid | Yes | 595 |
| 28 | 2,5-Dimethoxyaniline | N—(β-Hydroxyethyl)-γ acid | No | 510, 580 |

EXAMPLE 29

One part of the diazo compound represented by the formula

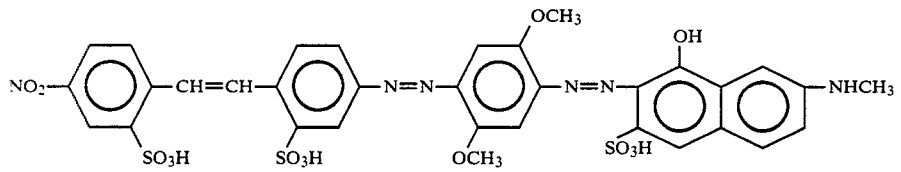

was dissolved in 1,000 parts of water to form a dye bath. A film (thickness: 75 μm, size: 70 mm×50 mm) of a saponification product of an ethylene-vinylacetate copolymer (ethylene content: 30% by mole, saponification degree of vinyl acetate component: 99% by mole) was dipped in the dye bath and dyed for 5 minutes at 40° C. After dyeing, the film was rinsed with water and water droplets on the film surface were thoroughly removed with filter paper, and the film was dried for 10 minutes at 80° C. in a dryer to obtain a violet dyed film. The $\lambda_{max}$ of this film was 610 nm. Then the film was stretched in a boric acid solution at 40° C. after dyeing for not only uniaxial direction but also a crossed direction thereof, a violet dyed film having an excellent durability was obtained.

What we claim is:

1. A water soluble disazo compound represented, in the free acid form, by the formula:

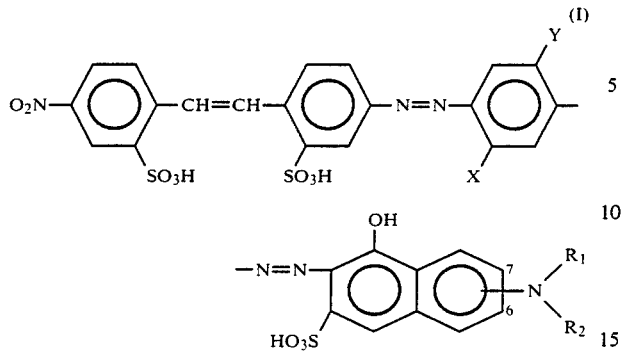

wherein X represents a hydrogen atom or a methyl, methoxy or ethoxy group; Y represents a methoxy or ethoxy group; R₁ represents a hydrogen atom or a methyl group; R₂ represents a hydrogen atom or a methyl, group, and the group is bonded at the 6- or 7-position, or a copper complex salt thereof.

2. A compound or a copper complex salt, according to claim 1, wherein X represents a methyl, methoxy or ethoxy group, Y represents a methoxy or ethoxy group, R₁ represents a hydrogen atom, and R₂ represents a hydrogen atom, a methyl, β-hydroxyethyl, phenyl or carboxyphenyl group.

3. The compound, according to claim 2, represented, in the free acid from, by the formula:

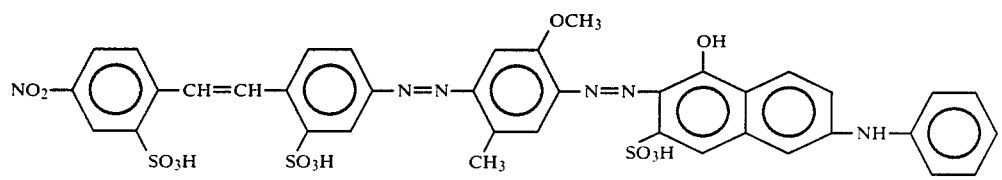

or a copper complex salt thereof.

4. The compound, according to claim 2, represented, in the free acid form, by the formula:

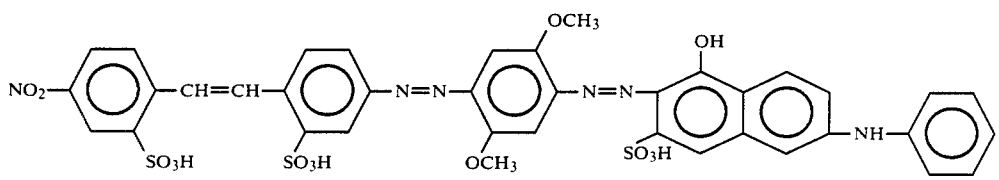

or a copper complex salt thereof.

5. The compound, according to claim 2, represented, in the free acid form, by the formula:

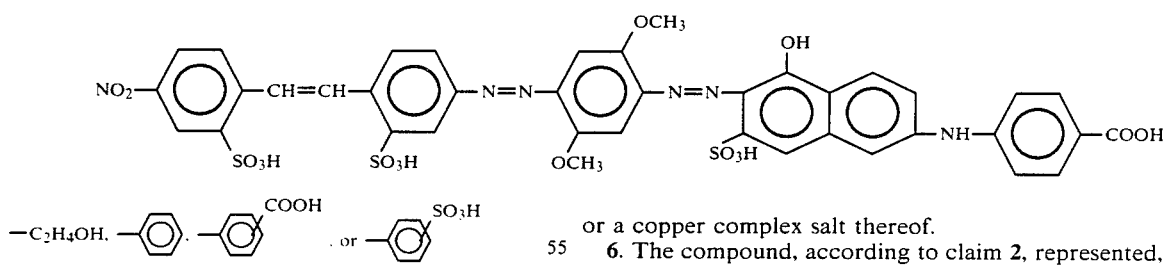

or a copper complex salt thereof.

6. The compound, according to claim 2, represented, in the free acid form, by the formula:

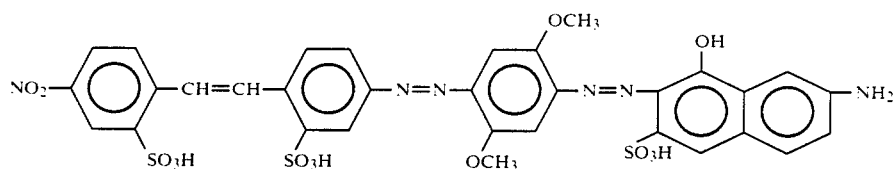

7. The compound, according to claim 2, represented, in the free acid form, by the formula:

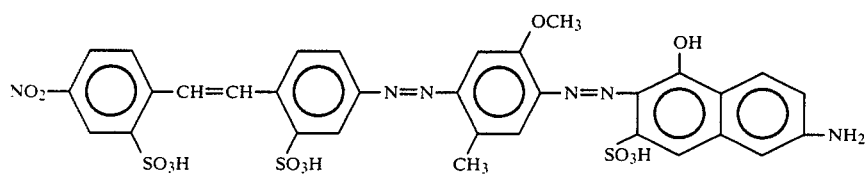

or a copper complex salt thereof.

8. The compound, according to claim 2, represented, in the free acid form, by the formula:

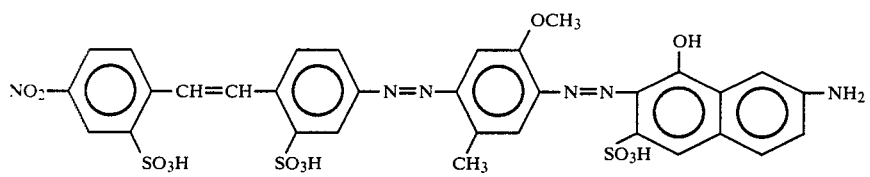

9. The compound, according to claim 2, represented, in the free acid form, by the formula:

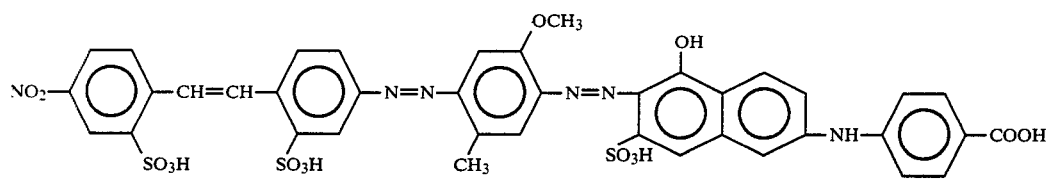

or a copper complex salt thereof.

10. The compound, according to claim 2, represented, in the free acid form, by the formula:

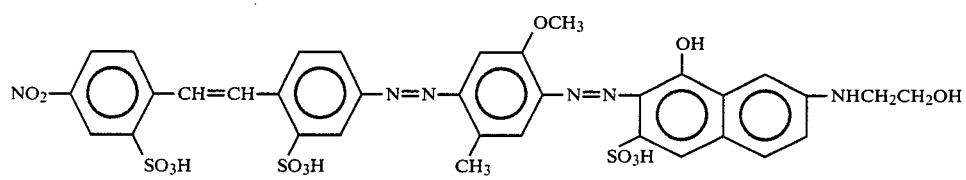

11. The compound, according to claim 2, represented, in the free acid form, by the formula:

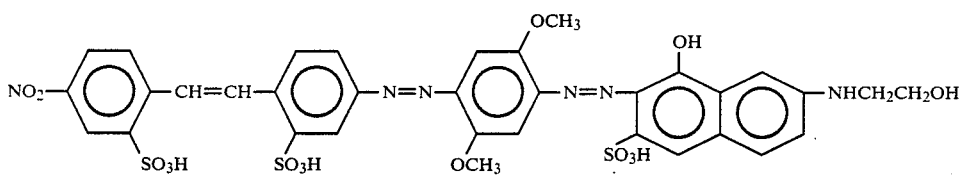

* * * * *